United States Patent [19]

Holder

[11] Patent Number: 5,125,182

[45] Date of Patent: Jun. 30, 1992

[54] PRE FOLDED ADHESIVE FISH LURE

[76] Inventor: Jack M. Holder, 80 Everest Dr., Hollister, Calif. 95023

[21] Appl. No.: 770,702

[22] Filed: Oct. 2, 1991

Related U.S. Application Data

[63] Continuation-in-part of Ser. No. 609,796, Nov. 6, 1990, abandoned.

[51] Int. Cl.⁵ .................................................. A01K 85/00
[52] U.S. Cl. .................................... 43/42.36; 43/42.49
[58] Field of Search ................. 43/42.24, 4.5, 42.37, 43/42.39, 42.36, 42.49, 42.23

[56] References Cited

U.S. PATENT DOCUMENTS

| | | | |
|---|---|---|---|
| 1,317,890 | 10/1919 | Patton | 43/42.51 |
| 1,569,993 | 1/1926 | MacLeod | 43/42.39 |
| 1,921,176 | 8/1933 | Unkefer | 43/42.37 |
| 2,423,431 | 7/1947 | Allen | 43/42.25 |
| 2,616,559 | 11/1952 | Hyland | 43/42.53 |
| 2,714,273 | 8/1955 | Torrance | 43/42.36 |
| 2,741,058 | 4/1956 | Allman | 43/42.36 |
| 2,780,022 | 2/1957 | Arntzen | 43/42.36 |
| 3,060,620 | 10/1962 | Binkowski | 43/42.24 |
| 3,403,469 | 10/1968 | Whitney | 43/42.39 |
| 3,538,189 | 9/1970 | Lilley | 43/42.33 |
| 3,570,168 | 3/1971 | Patten | 43/42.51 |
| 4,158,927 | 6/1979 | Capra et al. | 43/4.5 |
| 4,194,936 | 3/1980 | Martuch | 43/44.89 |
| 4,199,888 | 4/1980 | Barnes | 43/42.33 |
| 4,429,482 | 2/1984 | Honse | 43/42.32 |
| 4,665,642 | 5/1987 | Steinman | 43/42.52 |
| 4,807,383 | 2/1989 | Delwiche | 43/42.33 |

Primary Examiner—Richard K. Seidel
Assistant Examiner—Jeanne M. Elpel
Attorney, Agent, or Firm—Jeffrey A. Hall

[57] ABSTRACT

A fish lure of deformable, shapable material having an inner and an outer surface. The inner surface has a crease therein adapted to conform to a fishing line for quick alignment and further includes an adhesive layer so that the fishing lure may be quickly and easily attached to a fishing line or other surface with finger pressure thereby eliminating the need to tie a knot, or to use a swivel, clip, or other fastening device.

10 Claims, 1 Drawing Sheet

U.S. Patent June 30, 1992 5,125,182
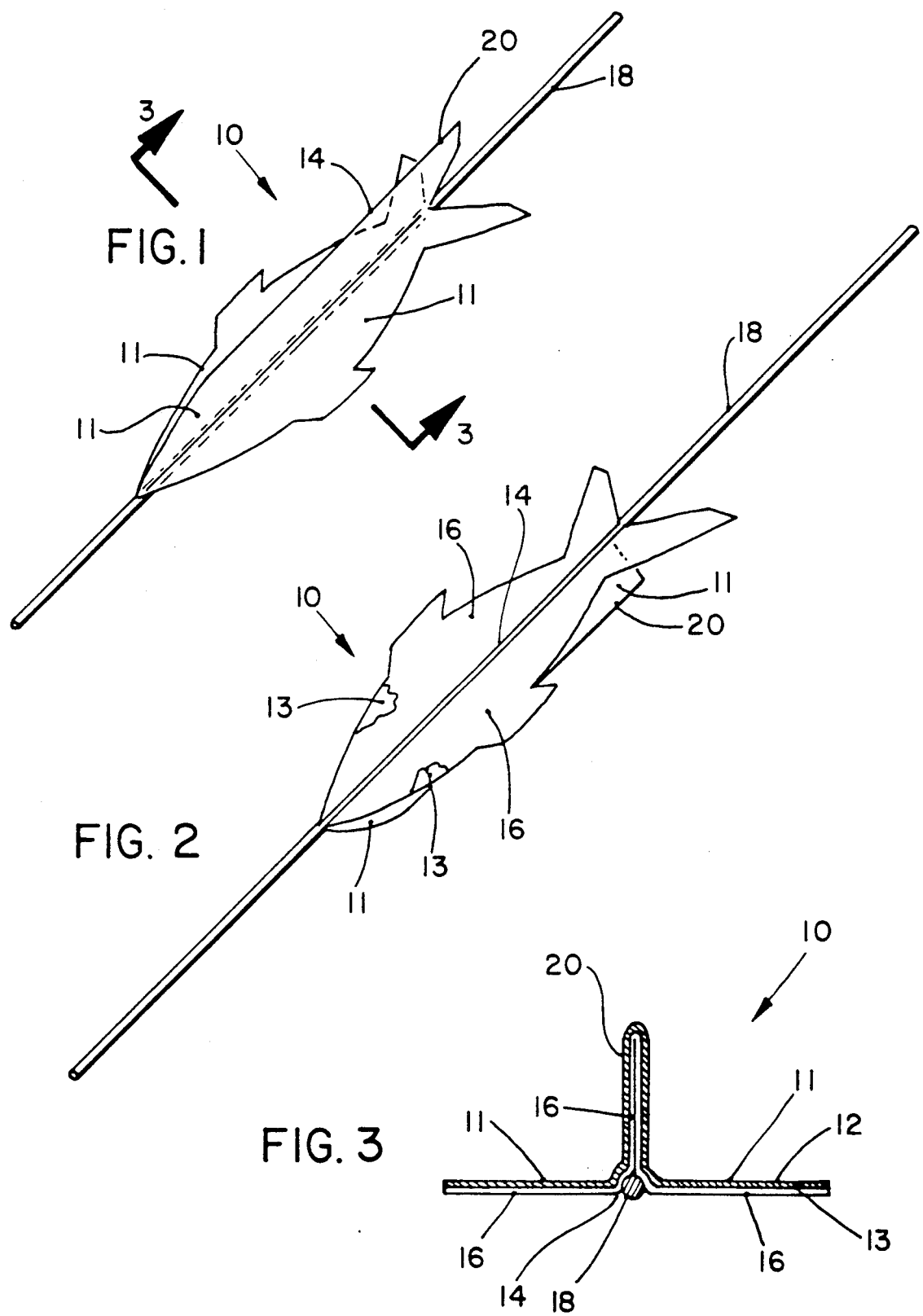

PRE FOLDED ADHESIVE FISH LURE

This is a continuation-in-part of Ser. No. 07/609,796 filed Nov. 6, 1990, now abandoned.

BACKGROUND OF THE INVENTION

1. Field of Invention

The present invention relates to artificial fishing lures, particularly to fishing lures which are secured to a fishing line by adhesives.

2. Description of Prior Art

The art of fish lures is a well-worked one, with a profusion of lures proposed and implemented, each alleged by its creator to be extremely effective in attracting fish. Usually, a fish lure is intended to simulate the movements, and to some extent, the appearance of a an aquatic organism, such as a minnow, on which fish prefer to feed. Consequently, most such lures are provided with shiny or highly reflective surfaces and are designed so as to have considerable motion as they move through the water while casting, trolling, or during their upward or downward movement in bottom fishing.

Of the numerous styles, shapes, colors and sizes of fishing lures, all possess a common denominator, namely all must be secured to a fishing line. The manner of attachment has, in the past, been achieved through various methods including: hooking the lure to a clip or swivel; tying a knot on the lure; placing the line through various holes in the lure; and embedding a hook in the lure and clipping the lure to a weight.

It would be very desirable therefore to have an efficient, reliable, and effective means to conveniently attach a fishing lure to a fishing line without having to tie on the lure, or use a swivel hook, clip, or any of the known, yet cumbersome methods of attachment, conventionally used to secure a fish lure to a fish line.

OBJECTS AND ADVANTAGES

Accordingly I claim the following as the objects and advantages of the invention: to provide a fish lure with a simple and efficient means to secure such a lure to a fishing line without necessitating the use of a knot, swivel, clip, or the like, to provide such a fish lure which may be secured to a fish line by finger pressure alone providing a fast and secure attachment, to provide such a fish lure which is lightweight and available in a wide a variety of shapes and colors, and to provide such a fish lure which allows the fisherman unlimited discretion in lure placement upon the fish line.

In addition I claim the following objects and advantages: to provide a fish lure which is composed of an extremely lightweight and durable material allowing all fisherman to take advantage of the flasher characteristics previously available to boat fisherman while trolling, to provide such a lure which may be used by itself or as a flasher to attract fish to bait or to another lure, and to provide such a fish lure which is extremely snag resistant thereby minimizing the number of snags and lost lures, and to provide such a fish lure which can be easily stored, transported, and manufactured.

Further objects and advantages will become apparent from a consideration of the ensuing description and accompanying drawings.

SUMMARY OF THE INVENTION

In accordance with the present invention, there is provided a fish lure which provides all of the desirable characteristics of an effective lure, which is extremely simple and inexpensive to manufacture, and is very durable and trouble free in use. The present invention comprises a fishing lure composed of a durable, deformable material having an outer surface and an inner surface. The inner surface preferably has a crease therein adapted to receive and secure a fishing line, and a adhesive layer on the inner surface of the deformable material whereby said fishing lure can be attached to a fishing line by finger pressure.

The deformable material may be composed of a foil, metal, plastic, or any other durable and deformable material. The lure may be configured as a fish, worm, or other aquatic organism, or may be shaped in various geometric configurations as desired. In one embodiment, the lure is configured as a fish having an elongate fin extending longitudinally along the outer surface.

The adhesive layer on the inner surface of the deformable material is preferably a water insoluble adhesive and any of a wide variety of adhesive may utilized such as a protein or protein derivative adhesive, a vegetable adhesive, a cellulose derivative adhesive, a thermoplastic adhesive, a rubber adhesive, or a combination of adhesives.

BRIEF DESCRIPTION OF THE DRAWINGS

FIG. 1 shows a front perspective view of a fishing lure attached to a fishing line, according to the invention.

FIG. 2 is a bottom view of such fishing lure attached to a fishing line, according to the invention.

FIG. 3 is a sectional view of such fishing lure, according to the invention.

DETAILED DESCRIPTION OF THE PREFERRED EMBODIMENT OF THE INVENTION

FIG. 1 shows a one piece fish lure 10 according to the preferred embodiment of the invention. The fish lure 10 comprises a body of durable deformable material 12 having an outer surface 11 and an inner surface 13. The inner surface 13 has a crease 14, preferably adapted to receive and conform to a fishing line 18. The crease may be formed from pre-folding the deformable material, molding the material to form a crease, or utilizing other conventional means to form a crease in deformable material may be successful employed.

An adhesive layer 16 on the inner surface 13 of deformable material 12 allows for quick and easy attachment of fish lure 10 to fish line 18 by finger pressure alone by squeezing together deformable material 12 to tighten and secure the fish lure 10 to the fish line. The fish lure 10 of the present invention may be secured to a fish line, lure, flasher, or other fishing device simply by securing adhesive 16 to the surface of such device, and shaping the deformable material 12 as desired. The fishing lure 10 is shown in FIG. 1 configured as a fish and having an elongate fin 20 extending longitudinally along outer surface 11, with crease 14 extending into fin 20.

The deformable material 12 of fish lure 10 is preferably composed of a foil, such as aluminum, however, other durable, malleable, shapable, and deformable materials may be used. For example, various plastics, foils, metals, composites, or the like may be utilized. The important characteristic being the ability to be shaped and adapted to a surface such as a fishing line so as to facilitate attachment thereto.

Adhesive layer 16 is preferably a water insoluble adhesive, but may be otherwise. For example, a protein or protein derivative, vegetable, cellulose derivative, rubber, or thermoplastic synthetic resin adhesive may be employed for example, with thermoplastic synthetic resin adhesives being preferred. Adhesive layer 16 may be focused around crease 14, or inner surface 13 may be partially or totally coated with adhesive layer 16 as desired. The important feature is that adhesive layer 16 provides sufficient adhesion to secure fish lure 10 to a fish line, flasher, lure, or other surface.

Referring now to FIG. 2 fishing lure 10 is shown secured to fishing line 18. Deformable material 12 is pressed together with adhesive layer 16 firmly attaching lure 10 to the fishing line. In the embodiment illustrated a crease 14 is utilized and the shape of the lure is fish shaped. Other designs and configurations may be utilized, such as different shapes, colors, and sizes of the lure, and be within the scope of the invention, merely exemplifying different embodiments thereof. Crease 14 is preferably centrally positioned on inner surface 13 so that the fishing lure can be symmetrically secured to fishing line 18 with a minimum of effort.

FIG. 3 illustrates a sectional view of fishing lure 10. Here, adhesive layer 16 and crease 14 are clearly shown with deformable material 12 being a thin foil, which may be produced in various colors, reflectivity, shapes, and sizes.

In operation and use fishing lure 10 is extremely simple to secure to a fishing line or other surface. The user simply uses finger pressure to squeeze fishing lure 10 around the line or other surface and adhesive layer 16 secures lure 10 thereto. Fishing lure 10 may be used for trolling, casting, or bottom fishing as a flasher type lure or in combination with a hook. No knots, swivels, clips or other hardware are required to securely and efficiently secure fishing lure 10 to a fishing line or other surface.

While the above description contain many specificities, these should not be construed as limitations on the scope of the invention, but merely as exemplifications of preferred embodiments thereof. Those skilled in the art will envision many other possible variations are within its scope. Accordingly, the scope of the invention should be determined by the scope of the appended claims and their legal equivalents, and not by the examples which have been given.

I claim:

1. A one-piece fishing lure for attachment to a fishing line, comprising:
    a deformable material having opposing ends and opposing sides, with an outer foil surface, and an inner surface having a water insoluble adhesive layer disposed upon the inner surface;
    a crease extending across the inner surface of said deformable material between opposing ends to form a preliminary centerfold portion secured by the adhesive layer, and outwardly extending side portions formed by the opposing sides of the deformable material;
    whereby the fishing line is secured to the deformable material by the adhesive layer at a location adjacent to the preliminary centerfold portion and the outwardly extending side portions of the fishing lure.

2. The fishing lure of claim 1 wherein said deformable material is shaped to represent a fish.

3. The fishing lure of claim 2 wherein said centerfold is shaped to represent an elongate dorsal fin extending longitudinally along said outer surface.

4. The fishing lure of claim 1 wherein said water insoluble adhesive layer comprises a protein based adhesive.

5. The fishing lure of claim 1 wherein said water insoluble adhesive layer comprises a protein derivative adhesive.

6. The fishing lure of claim 1 wherein said water insoluble adhesive layer comprises a vegetable adhesive.

7. The fishing lure of claim 1 wherein said water insoluble adhesive layer comprises a cellulose derivative adhesive.

8. The fishing lure of claim 1 wherein said water insoluble adhesive layer comprises a thermoplastic synthetic resin adhesive.

9. The fishing lure of claim 1 wherein said water insoluble adhesive layer comprises a rubber adhesive.

10. The fishing lure of claim 1 wherein said crease is centrally positioned on said inner surface of said fishing lure so that the fishing lure can be symmetrically secured to said fishing line with a minimum of effort.

* * * * *